June 7, 1932. E. L. WATSON 1,862,325
OUTDOOR SANITARY EXTERMINATOR FOR HOUSE AND BLOW FLIES
Filed May 18, 1931 2 Sheets-Sheet 1
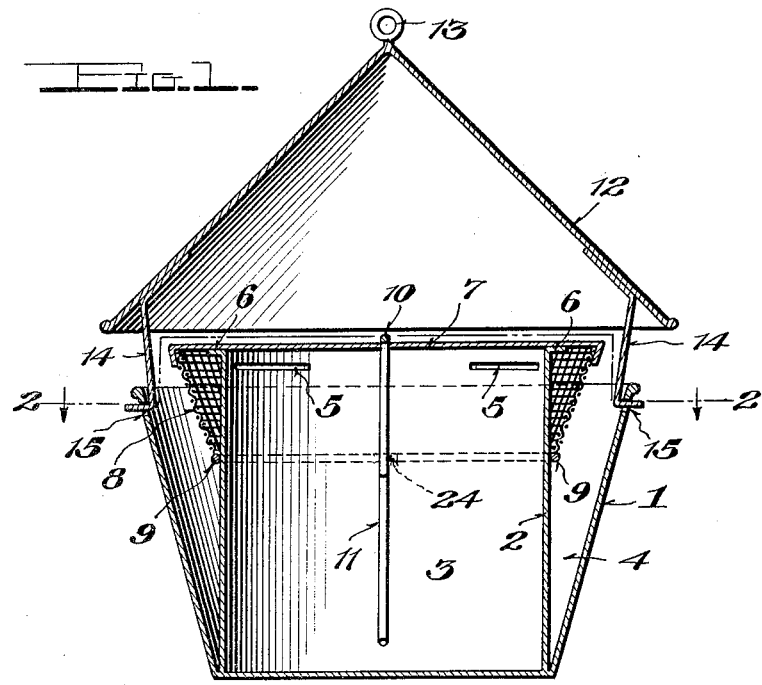
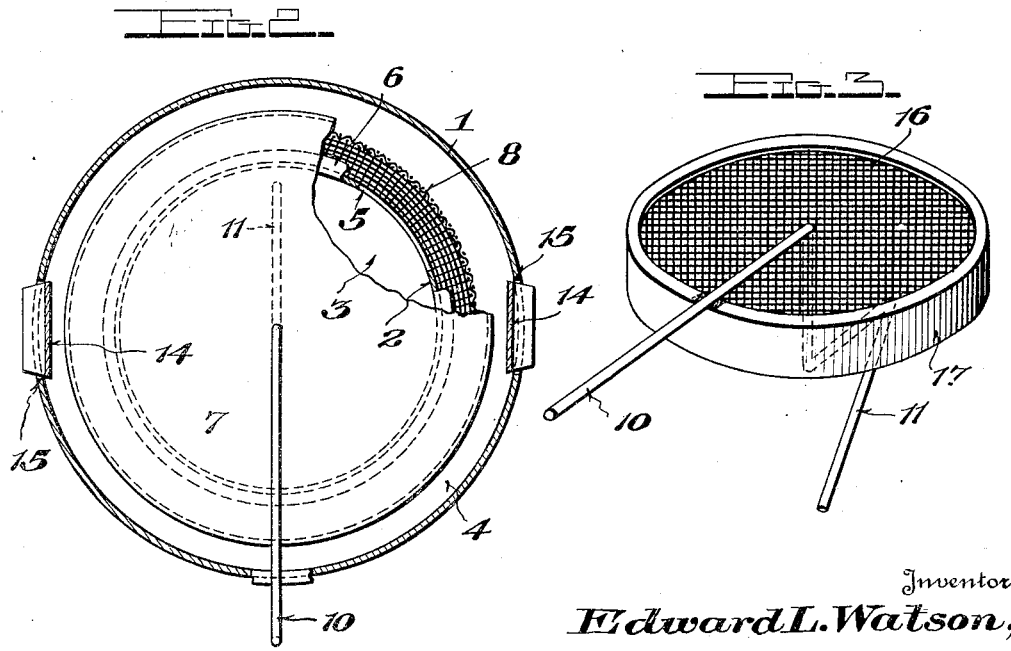
Inventor
Edward L. Watson,
By Lester L. Sargent
Attorney June 7, 1932. E. L. WATSON 1,862,325
OUTDOOR SANITARY EXTERMINATOR FOR HOUSE AND BLOW FLIES
Filed May 18, 1931 2 Sheets-Sheet 2
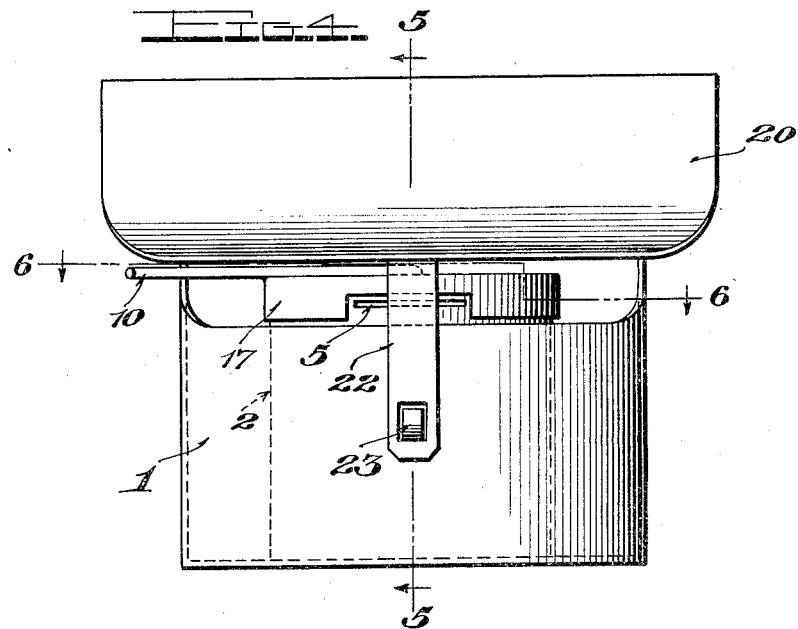
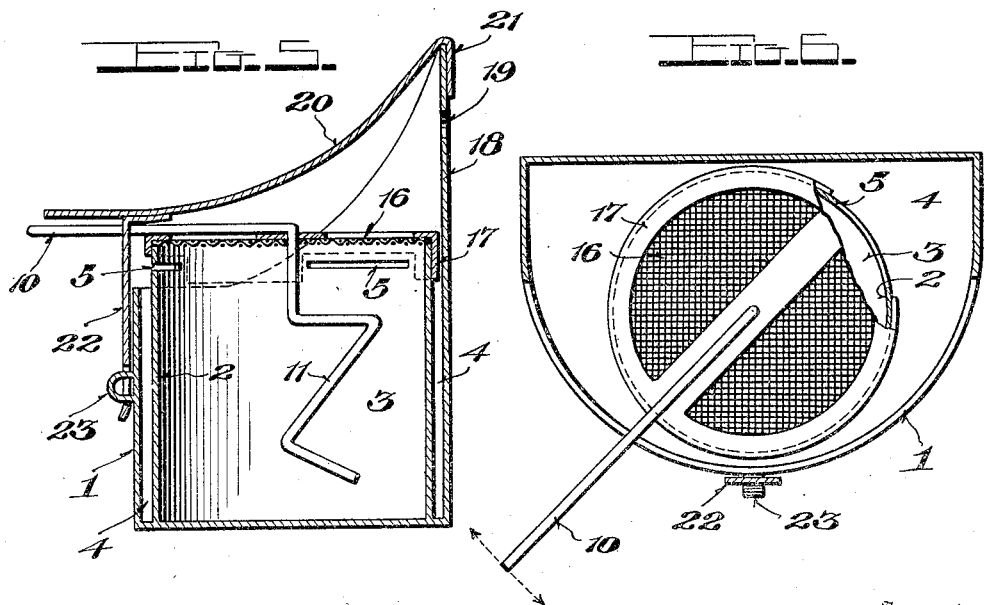
Inventor
Edward L. Watson,
By Lester L. Sargent
Attorney Patented June 7, 1932

1,862,325

UNITED STATES PATENT OFFICE

EDWARD L. WATSON, OF ROCHESTER, NEW YORK

OUTDOOR SANITARY EXTERMINATOR FOR HOUSE AND BLOW FLIES

Application filed May 18, 1931. Serial No. 538,320.

The object of my invention is to provide an improved exterminator for flies having one compartment in which the lure is placed and a separate compartment in which the poison bait is placed; and to provide novel means for preventing either flies or their larvæ from passing from the poison bait compartment to the lure compartment.

It is a further object of my invention to provide a device for stirring the lure. It is also an object of my invention to provide a sanitary form of container which can be used outdoors and readily attached to the wall or side of a building. I attain these and other objects of my invention by the device illustrated in the accompanying drawings, in which—

Figure 1 is a vertical section through my invention;

Fig. 2 is a section on line 2—2 of Fig. 1;

Fig. 3 is a detail perspective view of the original form of the invention for poisoning house flies;

Fig. 4 is a side elevation of a form of my invention which can be readily attached to the sides of buildings or walls;

Fig. 5 is a vertical section on line 5—5 of Fig. 4; and

Fig. 6 is a horizontal section on line 6—6 of Fig. 4.

Referring to the accompanying drawings, Fig. 3 illustrates the screen cover member 16 used in the original form of my invention, the screen being attached to a suitable metal rim 17 seating over the container 2. This form of my invention is best suited for exterminators intended for house flies.

Referring to Figs. 1 and 2, there is illustrated improved construction intended especially for exterminating blow flies. I provide a suitable outer container 1 and a suitable inner container 2 which is either integral or soldered or otherwise affixed to the base of the outer container. In container 1 is placed suitable poison bait in the annular chamber 4 while in the central chamber 3 is placed suitable lure such as any suitable fermenting matter. I provide a metal disc 7 seated on the rim 6 of container 2. To this disc 7 is attached an annular depending strip of wire screen 8 extending to the outer wall of the inner container and secured to a ring 9 which may be divided to permit of its being inserted over the rim 6 and which normally will seat snugly against the outer wall of the container 6. The container 2 is provided with suitable apertures 5 to permit the odor of the fermenting lure to emanate to attract insects. I provide a wire handle 10 attached to disc 7 and terminating in an angular portion 11 which functions as a stirrer element.

I provide a suitable conical cover 12 having a suspending ring 13 at its apex, and having resilient arms 14 adapted to releasably engage in the apertures 15 in the outer wall 1 of the container, as shown in Fig. 1.

Referring to Figs. 4, 5, and 6, there is illustrated a form of the invention especially designed for convenient attachment to walls and sides of buildings. In this form of the invention the outer container 1 is of substantially semicylindrical shape with a cylindrical inner container 2 for the lure and an encircling chamber 4 for the poison bait. The outer container has a flat wall or back 18 provided with an aperture 19 by means of which the device may be hung on a nail against the wall of a building. I provide a suitable curved cover 20 having a flange 21 seating over the top of the wall 18 as shown in Fig. 5 of the drawings. The cover 20 is provided with a slotted tongue 22 to releasably engage over the loop 23 which is attached to the front of the outer wall 1 of the container as shown in Figs. 4 and 6.

The method of using the device is to place a suitable fermenting lure such as fermenting animal or vegetable matter, in the inner container, and to place a suitable poison bait in the outer chamber. The apertures in the walls of the inner container permit the odor of the lure to escape and attract the flies. They cannot gain access to the inner container however because it is closed by the cover member and therefore will feed on the poison bait in the outer chamber. The form of the invention shown in Fig. 1 is especially designed for trapping blow flies and to prevent their larvæ from gaining access to the lure in the inner container which they would quickly eat up were they able to reach it. The metal disc 7 projects substantially beyond the rim 6 of the inner container 2 and serves to darken the chamber 4, thus making it more attractive to blow flies. By darkening the bait it increases the bacteria count several times and thus increases the efficiency of the bait.

The lure may be stirred up by grasping the handle 10 and swinging same around thus agitating the lure by means of the angular extension or stirrer 11.

The wire 9 is split as at 24 to permit of spreading it to pass over the outturned rim 6 in applying the cover member shown in Fig. 1 of the drawings. The conical roof 12 and the cover 20 function to protect the bait from sun, rain, and wind making the device weatherproof and tending to maintain an even temperature within the container.

The members 14 are sufficiently resilient to be sprung into and out of engagement with the slots 15 to permit of convenient removal and replacement of the cover 12.

It will be noted that the disc 7, screening 8 and wire ring 9 will prevent the insects from reaching the lure and permit them to gain access only to the poison bait in the outer compartment. These elements also function to prevent the larvæ from crawling into the inner compartment and it is for this purpose also that the out-turned rim 6 is provided. The blow flies deposit their eggs on the screening 8 and thence the larvæ will fall into the poison bait and will be destroyed, being unable to gain access to the inner compartment.

It is to be especially noted that the bait in the outer compartment is inert and deodorized by the poison placed in it, whereas the lure in the inner compartment is actively fermenting and thus by reason of its odor is effective in attracting flies to the bait in the outer compartment. In this respect my invention differs from the devices of other inventors.

It is sanitary so far as any dissemination of bait is concerned, as the bait in the outer compartment is inert so far as any bacterial action is concerned, and the insects are unable to gain access to the lure in the inner compartment. The device is of metal and easily cleaned.

What I claim is:

1. In an exterminator for flies, the combination of a container having an inner compartment to contain fermenting lure to attract the flies, an outer compartment to contain poison bait, the inner compartment having apertures near its rim to permit the odor of the lure to escape, a cover plate seated over the inner compartment and projecting substantially beyond the rim of the inner compartment to darken the outer compartment to make the outer compartment more attractive to blow flies, a strip of screen attached to the rim of said cover plate and a ring encircling the inner compartment and to which the lower edge of the screen is attached, to prevent the eggs and larvæ of blow flies from reaching the inner compartment.

2. In an exterminator for flies, the combination of a container having an inner compartment to contain fermenting lure to attract the flies, an outer compartment to contain poison bait, the inner compartment having apertures near its rim to permit the odor of the lure to escape, the inner compartment also having an outturned rim, a cover plate seated over the inner compartment and projecting substantially beyond the rim of the inner compartment to darken the outer compartment to make the outer compartment more atractive to blow flies, a depending strip of screen attached to the rim of said cover plate and extending to the outer walls of the inner compartment to prevent the eggs and larvæ of blow flies from reaching the inner compartment.

3. In an exterminator for flies, the combination of a container having an inner compartment to contain fermenting lure to attract the flies, an outer compartment to contain poison bait, the inner compartment having openings in its upper portion to permit the odor of the lure to escape and attract the flies, a cover plate seated over the inner compartment and projecting substantially beyond the rim of the inner compartment to darken the outer compartment to make the outer compartment more attractive to blow flies, a depending strip of screen attached to the rim of said cover plate and a ring to which the lower edge of the screen is attached, said ring encircling the inner compartment and to which the screen is attached to prevent the eggs and larvæ of blow flies from reaching the inner compartment, and a roof detachably secured to the outer compartment to render the compartments weatherproof and darkened.

4. In an exterminator for flies, the combination of a container having an inner compartment to contain fermenting lure to attract the flies, an outer compartment to contain poison bait, the inner compartment having apertures near its rim to permit the odor of the lure to escape, a cover plate seated over the inner compartment and projecting substantially beyond the rim of the inner compartment to darken the outer compartment to make the outer compartment more attractive to blow flies, a strip of screen attached to the rim of said cover plate and a ring to which the lower edge of the screen is attached, said ring encircling the inner compartment and to which the screen is attached to prevent the eggs and larvæ of blow flies from reaching the inner compartment, a handle affixed to the cover member of the inner compartment and an angular extension extending into the inner compartment to function as an agitator to permit of convenient operation to stir the lure to attract flies to the device.

5. In an exterminator for flies, the combination of a substantially semi-cylindrical outer container having a flat back to permit of the device being hung flat against walls or buildings, an inner container spaced from the outer container, to permit of placing of fermenting lure in the inner container and the placing of poison bait in the outer container, openings in the upper portion of the inner container for permitting the odor of the lure to escape and attract flies or other insects, an agitator device mounted on the cover of the inner container, said agitator including a projecting handle, and a cover member detachably seated on the outer container.

EDWARD L. WATSON.